Jan. 9, 1951          C. STOECKIG          2,537,195
RECIPROCATING DRIVE
Filed July 18, 1947
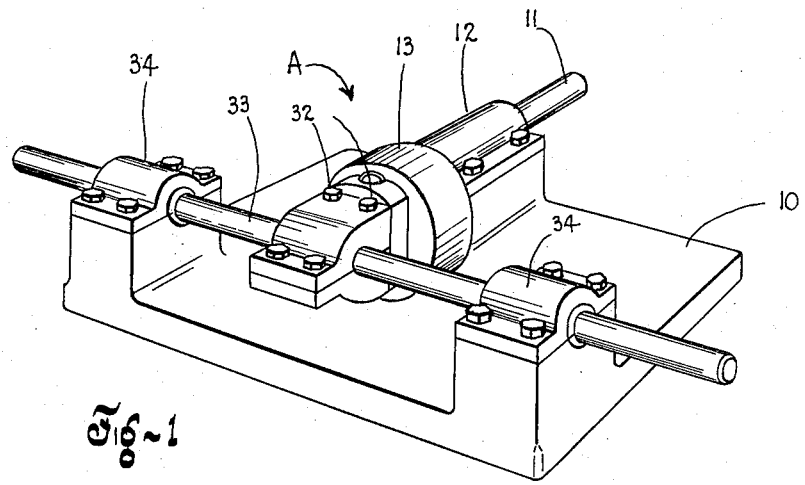
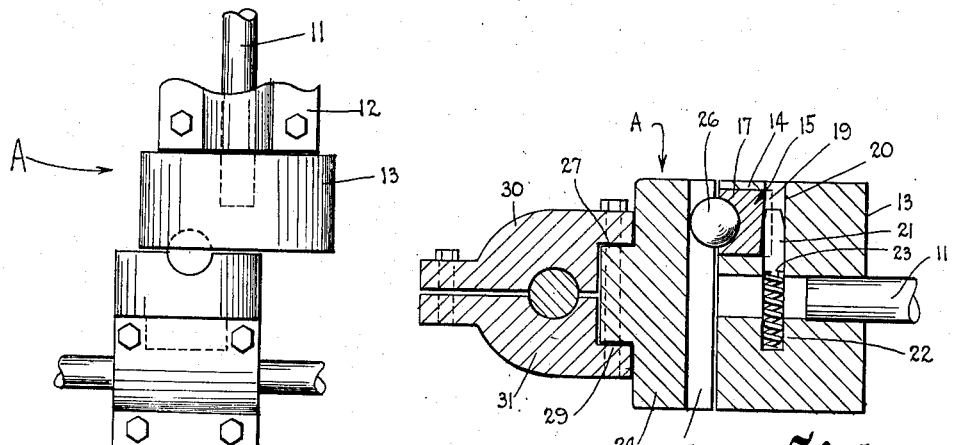
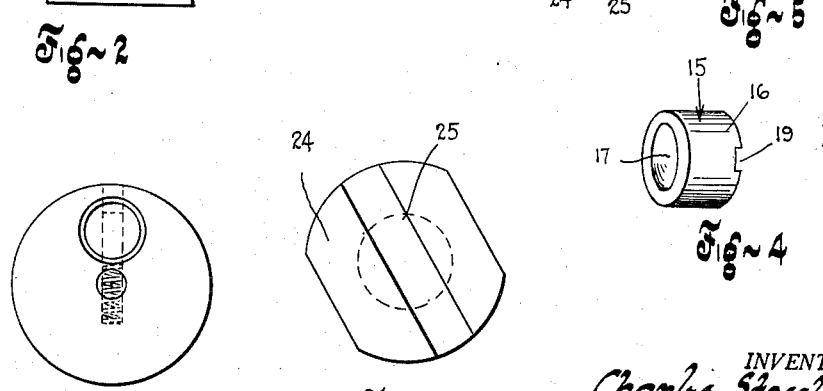
INVENTOR.
Charles Stoeckig
BY
Robert M. Dunning Patented Jan. 9, 1951

2,537,195

UNITED STATES PATENT OFFICE 2,537,195

RECIPROCATING DRIVE

Charles Stoeckig, St. Paul, Minn.

Application July 18, 1947, Serial No. 761,821

8 Claims. (Cl. 74—50)

My invention relates to an improvement in reciprocating drive and deals more particularly with a device for transferring rotary motion to reciprocating motion.

The object of the present invention is to provide a device which is capable of transmitting the rotary movement of one shaft to a reciprocating movement of a second shaft or other slidable member. The axis of the rotary shaft transmits rotation to a suitable disc or arm supporting a spherical ball. The reciprocable member is provided with a slide in which the ball may move upon rotation of the disc or arm. As a result the slide and the supporting mechanism therefor is reciprocated by rotation of the drive shaft.

A feature of the present invention lies in the use of a spherical ball or ball bearing as the connecting means between the rotatable member and the reciprocable slide. This bearing is free to move in its socket and is therefore capable of resisting wear more readily than a fixed projection or roller.

A feature of the present invention lies in the mounting of the sphere or ball bearing in a socket which is supported for movement axially of the drive shaft. As a result any wear in the slide or socket may be compensated for by movement of the ball.

A feature of the present invention lies in the provision of a ball socket having a spring urged cam or wedge urging the same toward the slide in which the ball engages. Thus wear in the slide is automatically compensated for by the movement of the socket.

An added feature of the present invention resides in the provision of a slide which is rotatably adjustable on its slidable support. By changing the angle of the slide relative to its support the length of reciprocating movement may be varied. Thus the length of stroke obtained may be varied by changing the angular position of the slide.

These and other objects and novel features of my invention will be more clearly and fully set forth in the following specification and claims.

In the drawings forming a part of my specification:

Figure 1 is a perspective view of a drive mounting showing the general arrangement of the drive.

Figure 2 is a top plan view of the connection between the rotatable member and the slide showing the construction thereof.

Figure 3 is a front elevational view of the drive disc showing the socket in which the ball is mounted.

Figure 4 is a perspective view of the socket removed from its supporting disc.

Figure 5 is a sectional view through the drive showing the manner in which the socket may be adjusted and showing the manner in which the slide may be adjusted in angle relative to its supporting member.

Figure 6 is an elevation view of the face of the slide showing the slide in full lines in one adjusted position and showing the slide in dotted outline in another angular position.

The drive mechanism A is shown as mounted upon a base plate 10. Obviously the drive member may be used for a great number of different purposes and the mechanism in which it is used is therefore not illustrated in detail. In actual practice the drive is used on jig-saws, filing machines, mowing machines, and similar devices which require a reciprocatory movement and which are usually driven by means of a rotatable motor.

The drive A includes a drive shaft 11 which is shown supported in a suitable bearing 12 mounted upon the base plate 10. A driving disc 13 is shown fixed to the shaft 11. The disc 13 may form an integral part of the shaft 11 or may be keyed or otherwise affixed thereto. Furthermore the member 13 need not be disc shaped in outline as an arm mounted upon the shaft 11 could serve a similar purpose. The disc shaped outline is preferred, however, as such a device is not as likely to cause injury to a machine operator.

The disc 13 is provided with a cylindrical recess 14 therein having its axis in parallel spaced relation to that of the shaft 11. A socket 15 is slidably mounted in the recess 14. The socket 15 is best illustrated in Figures 4 and 5 of the drawings and includes a generally cylindrical body 16 having a semi-spherical socket 17 in one end thereof. A tapered groove 19 is provided in the end of the socket 15 opposite that having the spherical recess 17.

An aperture 20 extends into the disc shaped member 13. The axis of the aperture 20 preferably intersects the axes of the aperture 14 and the shaft 11. A wedge shaped plunger 21 is slidably supported in the aperture 20 and is urged outwardly by means of a spring 22. A guide boss 23 on the plunger 21 preferably extends into one end of the spring 22 to hold the spring in proper relation relative to the plunger.

As will be noted in Figure 5 of the drawings the wedge shaped plunger engages the tapered slot 19 in a manner to urge the socket 15 outwardly under spring tension. This tapered slot 19 and wedge shaped spring urged plunger 21 are provided to compensate for any variance in space between the driving and driven element and also to compensate for any wear in these elements.

The driven element is shown as comprising a disc 24 having a diametrically extending groove 25 therein. This groove 25 has a contour to closely fit the spherical ball or ball bearing 26 mounted in the socket 15. The slide disc 24 is provided with a cylindrical projecting boss or hub 26 on its rear surface. This hub 27 is supported in a cylindrical socket 29 formed in a pair of clamping members 30 and 31. Clamping bolts 32 or other suitable means are provided for clamping the clamping members 30 and 31 together to hold the hub 27 and accordingly the disc 24 in any desired angular position.

The operation of my drive is believed obvious from the foregoing description. Rotation of the drive shaft 11 acts to rotate the drive disc 13 in unison therewith. The disc 13 supports the socket member 15 which in turn supports the ball bearing 26. The ball bearing 26 is slidable in a groove or slot 25 in the driven disc 24. Rotation of the drive shaft 11 thus moves the disc 24 and the clamping members 30 and 31 supporting the same in a reciprocable movement. The clamping members 30 and 31 are mounted upon a slidable shaft 33 which is slidably supported in a pair of supporting bearings 34 on the base 10.

Any variation in distance between the discs 24 and 13 will be compensated for by slidable movement of the socket member 15 in its aperture 14. The plunger 21 will be forced outwardly by the spring 22 to urge the socket 15 longitudinally toward the disc 24. Thus the ball bearing is so supported that any wear therein may be compensated for by movement of the socket member 15.

If it is desired to vary the length of stroke of the slidable shaft 33, the disc 24 may be rotated relative to the clamping members 30 and 31 so as to position the groove 25 on an angle as illustrated in Figure 6 of the drawings. By inclining the slot 25 in this manner the ball is forced to travel a greater distance in the groove 25, thus increasing the length of movement of the slidable shaft. Obviously the adjustment of the groove 25 is limited in its scope, as the groove must be retained at proper angle to the movement of the slidable member to impart sliding movement thereto as the drive disc rotates. Furthermore the groove 25 must be sufficiently inclined from horizontal so that the ball bearing 26 may travel to the upper and lower limits of its rotative movement.

My drive forms a simple and effective way of translating rotative movement into reciprocating movement and compensates for any wear which might take place in the drive mechanism. Furthermore the length of stroke of my driven device may be adjusted by inclining the slide in which the rotatably moving ball must travel.

In accordance with the patent statutes, I have described the principles of construction and operation of my reciprocating drive, and while I have endeavored to set forth the best embodiment thereof, I desire to have it understood that obvious changes may be made within the scope of the following claims without departing from the spirit of my invention.

I claim:

1. A drive device including a drive shaft, a crank member secured thereto, a generally semi-spherical socket in said crank member, a ball bearing in said socket, a slide embracing the portion of the ball bearing projecting from said socket, means slidably supporting said slide and adjustable means connecting said slide and said supporting means whereby the angularity of the slide may be regulated.

2. A drive device including a shaft, a crank member supported thereon for movement therewith, a reciprocating element, a slide rotatable about an axis parallel to the axis of said shaft mounted on said reciprocating element, and a ball bearing supported by said crank member and projecting therefrom, said ball bearing being engaged in said slide, and means for holding said slide from rotation relative to said reciprocating support.

3. A drive mechanism including a drive shaft, a reciprocating member designed to be driven by said drive shaft, a slide rotatable about an axis parallel to the axis of said shaft mounted on said reciprocable member, said slide extending normal to its axis of rotation, a ball bearing supported by said drive shaft at a point spaced from the axis thereof, said ball bearing engaging in said slide to reciprocate the same, and means for holding said slide from rotation relative to said reciprocable member.

4. A drive mechanism including a drive shaft, a member mounted on said drive shaft and rotatable therewith, a socket slidably supported by said rotatable member for movement on an axis parallel to the axis of said drive shaft, a slide supported to intersect the axis of the drive shaft, means slidably supporting said slide, and a ball bearing engaged in said socket and engaged in said slide so that rotatable movement of said drive shaft will reciprocate said slide.

5. A drive mechanism including a drive shaft, a member mounted on said drive shaft and rotatable therewith, a socket slidably supported by said rotatable member for movement on an axis parallel to the axis of said drive shaft, a slide supported to intersect the axis of the drive shaft, means slidably supporting said slide, a ball bearing engaged in said socket and engaged in said slide so that rotatable movement of said drive shaft will reciprocate said slide, and means for urging said socket member toward said slide.

6. A drive mechanism including a drive shaft, a member mounted on said drive shaft and rotatable therewith, a socket slidably supported by said rotatable member for movement on an axis parallel to the axis of said drive shaft, a slide supported to intersect the axis of the drive shaft, means slidably supporting said slide, a ball bearing engaged in said socket and engaged in said slide so that rotatable movement of said drive shaft will reciprocate said slide, cam means for urging said socket toward said slide, and resilient means urging said cam means.

7. A drive mechanism including a drive shaft, a disc supported thereby, a cylindrical aperture in said disc having its axis parallel the axis of said shaft, a socket slidably mounted in said aperture, a reciprocable element slidably supported adjacent said disc, a grooved slide forming a part of said reciprocable element, a ball bearing in said socket and slidable in said grooved slide, and means for urging said socket toward said grooved slide.

8. A drive mechanism including a drive shaft, a disc supported thereby, a cylindrical aperture in said disc having its axis parallel the axis of said shaft, a socket slidably mounted in said aperture, a reciprocable element slidably supported adjacent said disc, a grooved slide forming a part of said reciprocable element, a ball bearing in said socket and slidable in said grooved slide, means for urging said socket toward said grooved slide, means on said reciprocable element for rotatably supporting said grooved slide, and means for holding said slide in proper angular relation relative to said reciprocating element.

CHARLES STOECKIG.

REFERENCES CITED

The following references are of record in the file of this patent:

UNITED STATES PATENTS

| Number | Name | Date |
|---|---|---|
| 968,437 | Wellman | Aug. 23, 1910 |
| 2,012,028 | Twyman | Aug. 20, 1935 |